United States Patent
Iwachi

(10) Patent No.: US 11,767,383 B2
(45) Date of Patent: Sep. 26, 2023

(54) TERMINALLY MODIFIED DIENE-BASED POLYMER AND METHOD FOR PRODUCING THE SAME

(71) Applicant: Toyo Tire Corporation, Itami (JP)

(72) Inventor: Taiki Iwachi, Itami (JP)

(73) Assignee: Toyo Tire Corporation, Itami (JP)

( * ) Notice: Subject to any disclaimer, the term of this patent is extended or adjusted under 35 U.S.C. 154(b) by 0 days.

(21) Appl. No.: 17/960,258

(22) Filed: Oct. 5, 2022

(65) Prior Publication Data

US 2023/0128690 A1 Apr. 27, 2023

(30) Foreign Application Priority Data

Oct. 25, 2021 (JP) .................................. 2021-173868

(51) Int. Cl.
| | | |
|---|---|---|
| C08C 19/24 | (2006.01) | |
| C08F 136/08 | (2006.01) | |
| C08C 19/04 | (2006.01) | |
| C08C 19/22 | (2006.01) | |

(52) U.S. Cl.
CPC ............ *C08F 136/08* (2013.01); *C08C 19/04* (2013.01); *C08C 19/22* (2013.01); *C08C 19/24* (2013.01); *C08F 2810/40* (2013.01)

(58) Field of Classification Search
CPC ..... C08F 2810/40; C08C 19/00; C08C 19/04; C08C 19/22; C08C 19/24
See application file for complete search history.

(56) References Cited

U.S. PATENT DOCUMENTS

| | | | |
|---|---|---|---|
| 2017/0275400 A1* | 9/2017 | Hirata | ....................... B60C 1/00 |
| 2021/0122852 A1* | 4/2021 | Iwachi | ..................... C08C 19/04 |
| 2022/0153934 A1 | 3/2022 | Harada et al. | |

FOREIGN PATENT DOCUMENTS

| | | |
|---|---|---|
| JP | 2017-31370 A | 2/2017 |
| JP | 2020-143220 A | 9/2020 |
| JP | 2020-186364 A | 11/2020 |

OTHER PUBLICATIONS

Nichita, Polymer Bulletin (2019) 76:4539-4557 (Year: 2019).*

* cited by examiner

*Primary Examiner* — Robert C Boyle
(74) *Attorney, Agent, or Firm* — WHDA, LLP

(57) ABSTRACT

Provided are a terminally modified diene-based polymer having excellent mechanical properties and also a method for producing the same. The terminally modified diene-based polymer is obtainable by allowing a diene-based polymer terminated with ketone or aldehyde groups to react with an aminophosphonic acid compound represented by general formula (1) or (2):

[Chemical Formula 1]

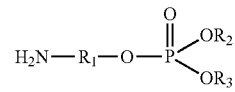

(1)

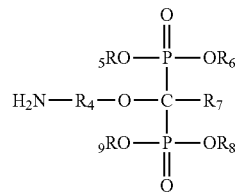

(2)

wherein in formulas (1) and (2), $R_1$ and $R_4$ each represent a $C_{1-10}$ alkanediyl group, $R_2$ and $R_3$ may be the same or different and each represent hydrogen, a $C_{1-3}$ alkyl group, or a phenyl group, $R_5$, $R_6$, $R_8$, and $R_9$ may be the same or different and each represent hydrogen, a $C_{1-3}$ alkyl group, or a phenyl group, and $R_7$ represents hydrogen or a hydroxyl group.

8 Claims, No Drawings

TERMINALLY MODIFIED DIENE-BASED POLYMER AND METHOD FOR PRODUCING THE SAME

BACKGROUND OF THE INVENTION

1. Field of the Invention

The present invention relates to a terminally modified diene-based polymer and also to a method for producing the same.

2. Description of the Related Art

Various means for enhancing the physical properties of rubber polymers have been studied. For example, JP-A 2017-31370 describes a method for producing a modified polymer, including allowing a polymer having at least one carbon-carbon double bond to react with a compound represented by formula (M) to produce a modified polymer. According to the method for producing a modified polymer, when the polymer is allowed to react with the compound, a manganese catalyst having an acetylacetonate ligand is used. However, because the double bond is consumed during the addition reaction of the phosphoric acid group, there may be a decrease in crosslinking density, for example.

In addition, JP-A-2020-186364 describes that carboxy ions are introduced and allowed to form ionic bonds, whereby mechanical strength can be significantly improved. However, when ionic functional groups are contained in a rubber, such a rubber becomes water absorbent. Because the strength decreases due to water absorption, there is a problem in that it is difficult to control the amount of functional group introduction.

In addition, JP-A-2020-143220 describes that host and guest molecules were introduced in the polymer chain, and, due to their host-guest interaction, a crosslinked structure was formed to improve the mechanical strength. However, there are problems in that cyclodextrin used as the host molecule is expensive, and also that its rubber compatibility is low, causing aggregation in the rubber.

SUMMARY OF THE INVENTION

In light of the above points, an object of the invention is to provide a terminally modified diene-based polymer having excellent mechanical properties and also a method for producing the same.

According to an aspect of the invention, there is provided a terminally modified diene-based polymer obtainable by allowing a diene-based polymer terminated with ketone or aldehyde groups to react with an aminophosphonic acid compound represented by general formula (1) or (2).

[Chemical Formula 1]

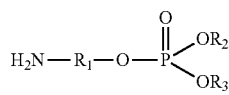
(1)

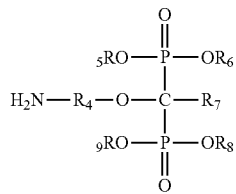
(2)

Note that in formulas (1) and (2), $R_1$ and $R_4$ each represent a $C_{1-10}$ alkanediyl group, $R_2$ and $R_3$ may be the same or different and each represent hydrogen, a $C_{1-3}$ alkyl group, or a phenyl group, $R_5$, $R_6$, $R_8$, and $R_9$ may be the same or different and each represent hydrogen, a $C_{1-3}$ alkyl group, or a phenyl group, and $R_7$ represents hydrogen or a hydroxyl group.

It is possible that the amount of the aminophosphonic acid compound added is 0.01 to 0.5 mol per kg of the diene-based polymer.

It is possible that the terminally modified diene-based polymer according to an aspect of the invention has a weight average molecular weight of 400,000 and 2,600,000.

According to another aspect of the invention, there is provided a method for producing a terminally modified diene-based polymer, including: an oxidative decomposition step of adding an oxidizing agent to a diene-based polymer to oxidatively cleave a carbon-carbon double bond, thereby giving an oxidatively decomposed diene-based polymer; and a terminal modification step of allowing the obtained oxidatively decomposed diene-based polymer to react with an aminophosphonic acid compound represented by general formula (1) or (2).

[Chemical Formula 2]

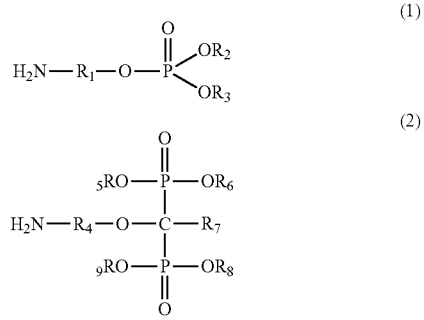

Note that in formulas (1) and (2), $R_1$ and $R_4$ each represent a $C_{1-10}$ alkanediyl group, $R_2$ and $R_3$ may be the same or different and each represent hydrogen, a $C_{1-3}$ alkyl group, or a phenyl group, $R_5$, $R_6$, $R_8$, and $R_9$ may be the same or different and each represent hydrogen, a $C_{1-3}$ alkyl group, or a phenyl group, and $R_7$ represents hydrogen or a hydroxyl group.

It is possible that the amount of the aminophosphonic acid compound added is 0.01 to 0.5 mol per kg of the diene-based polymer.

It is possible that rubber latex is used as the diene-based polymer.

According to aspects of the invention, a terminally modified diene-based polymer having excellent mechanical properties and a method for producing the same can be provided.

DESCRIPTION OF EMBODIMENTS

Hereinafter, matters relevant to the implementation of the invention will be described in detail.

A terminally modified diene-based polymer according to this embodiment is obtainable by allowing a diene-based polymer terminated with ketone or aldehyde groups to react with an aminophosphonic acid compound represented by general formula (1) or (2).

[Chemical Formula 3]

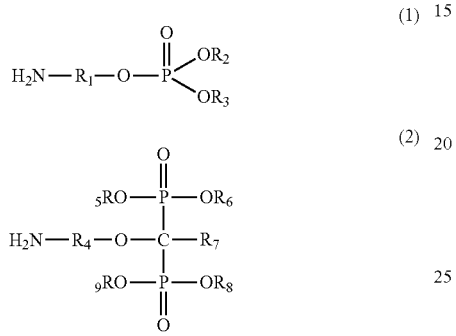

(1)

(2)

Note that in formulas (1) and (2), $R_1$ and $R_4$ each represent a $C_{1-10}$ alkanediyl group, $R_2$ and $R_3$ may be the same or different and each represent hydrogen, a $C_{1-3}$ alkyl group, or a phenyl group, $R_5$, $R_6$, $R_8$, and $R_9$ may be the same or different and each represent hydrogen, a $C_{1-3}$ alkyl group, or a phenyl group, and $R_7$ represents hydrogen or a hydroxyl group.

The terminally modified diene-based polymer preferably has, at its terminus, at least one of structures represented by general formulas (1a) to (1d) and (2a) to (2d). Note that in formulas (1a) to (1d) and (2a) to (2d), $R_1$ and $R_4$ each represent a $C_{1-10}$ alkanediyl group, $R_2$ and $R_3$ may be the same or different and each represent hydrogen, a $C_{1-3}$ alkyl group, or a phenyl group, $R_5$, $R_6$, $R_8$, and $R_9$ may be the same or different and each represent hydrogen, a $C_{1-3}$ alkyl group, or a phenyl group, and $R_7$ represents hydrogen or a hydroxyl group.

[Chemical Formula 4]

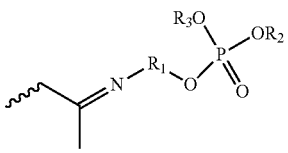

(1a)

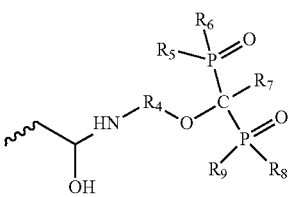

(1b)

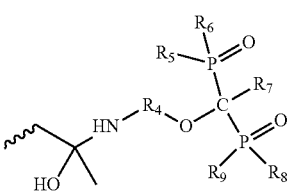

(1c)

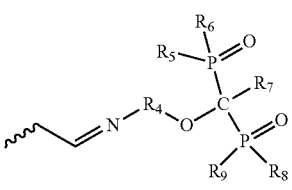

(1d)

[Chemical Formula 5]

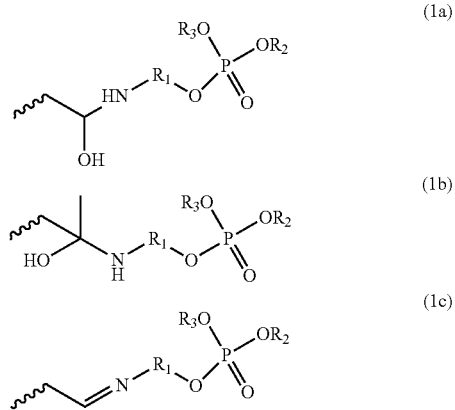

(2a)

(2b)

(2c)

(2d)

A method for producing a terminally modified diene-based polymer according to this embodiment includes: an oxidative decomposition step of adding an oxidizing agent to a diene-based polymer to oxidatively cleave a carbon-carbon double bond, thereby giving an oxidatively decomposed diene-based polymer; and a terminal modification step in which the aminophosphonic acid compound described above is added to the obtained oxidatively decomposed diene-based polymer and allowed to react. The oxidative decomposition step and the terminal modification step may be performed in one pot. Here, "one pot" means that synthesis is continuously performed in one container.

That is, the terminally modified diene-based polymer according to this embodiment is obtained by decomposing a diene polymer by the oxidative cleavage of a carbon-carbon double bond present in its main chain, and allowing the system containing the decomposed polymer to react with an aminophosphonic acid compound, thereby terminally modifying the polymer.

The diene-based polymer to be modified is a polymer containing a structural unit composed of a conjugated diene monomer, which may be a homopolymer of one kind of conjugated diene monomer, a copolymer of two or more kinds of conjugated diene monomers, or a copolymer of one kind or two or more kinds of conjugated diene monomers and a vinyl monomer. For example, natural rubber (NR), isoprene rubber (IR), butadiene rubber (BR), styrene butadiene rubber (SBR), styrene-isoprene copolymer rubbers, butadiene-isoprene copolymer rubbers, styrene-isoprene-butadiene copolymer rubbers, and the like can be mentioned. These diene-based rubbers may be used alone, and it is also possible to use a blend of two or more kinds.

The diene-based polymer to be modified may be liquid or solid at room temperature (23° C.). The weight average molecular weight of the diene-based polymer is not particularly limited, and may be 10,000 to 4,000,000, 50,000 to 1,000,000, or 100,000 to 300,000. Here, "weight average molecular weight" herein is a value of the polystyrene-equivalent weight average molecular weight measured by gel permeation chromatography (GPC) measurement.

The cis content in the diene-based polymer to be modified is not particularly limited, but is, in view of promoting strain-induced crystallization, preferably 95% or more, and more preferably 98% or more.

In addition, the diene-based polymer may be dissolved in a solvent or dispersed in a dispersion medium, and it is preferable to use an aqueous emulsion that is micellar in water, which is a protonic dispersion medium. That is, it is preferable to use rubber latex. Use of an aqueous emulsion makes it possible that after the polymer is decomposed, an aminophosphonic acid compound is incorporated in such a state to cause a terminal modification reaction. That is, synthesis can be continuously performed in one container. The concentration of the aqueous emulsion (solids content concentration of the polymer) is not particularly limited, but is preferably 5 to 70 mass %, and more preferably 10 to 50 mass %. When the solids content concentration is too high, the emulsion stability decreases, while when the solids content concentration is too low, the reaction rate decreases, reducing practicality.

The diene-based polymer is decomposed by the oxidative cleavage described above, and a polymer having, at its terminus, a carbonyl group (>C=O) or a formyl group (—CHO) is thus obtained. Specifically, a polymer having, at its terminus, a structure represented by the following formula (A) is generated.

[Chemical Formula 6]

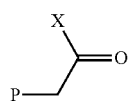

(A)

In formula (A), X is a hydrogen atom or a methyl group. In the case where the isoprene unit is cleaved, X becomes a methyl group at one cleaved terminus, while X becomes a hydrogen atom at the other cleaved terminus. In formula (A), P represents the polymer chain after oxidative cleavage.

An oxidizing agent can be used for oxidatively cleaving the carbon-carbon double bond of the diene-based polymer. For example, an oxidizing agent can be added to an aqueous emulsion of the diene-based polymer and stirred to cause oxidative cleavage. As oxidizing agents, for example, manganese compounds such as potassium permanganate and manganese oxide, chromium compounds such as chromic acid and chromium trioxide, peroxides such as hydrogen peroxide, perhalogen acids such as periodic acid, oxygen species such as ozone and oxygen, and the like can be mentioned. Among them, it is preferable to use periodic acid. At the time of oxidative cleavage, a metallic oxidation catalyst, for example, a chloride of a metal such as cobalt, copper, or iron, its salt or complex with an organic compound, etc., may also be used. For example, air oxidation may be performed in the presence of the metallic oxidation catalyst.

As a result of polymer decomposition by the oxidative cleavage described above, the molecular weight decreases. The weight average molecular weight of the polymer after decomposition is not particularly limited, but is preferably 5,000 to 3,000,000, and more preferably 300,000 to 2,000,000.

After the polymer is decomposed as above, the reaction system containing the decomposed polymer is allowed to react with the aminophosphonic acid compound. After the reaction, the aqueous emulsion is coagulated and dried, whereby a terminally modified diene-based polymer that is solid at room temperature (23° C.) is obtained. The obtained terminally modified diene-based polymer preferably has any of terminal structures of the above formulas (1a) to (1d) and (2a) to (2d).

For example, terminal structures represented by the above formulas (1a) to (1d) can be obtained through the following reactions. That is, an aminophosphonic acid compound represented by formula (1) undergoes a nucleophilic addition reaction with a carbonyl group or formyl group of the structure represented by general formula (A), thereby forming a terminal structure represented by general formula (1a) or (1b). When a dehydration reaction further occurs, a terminal structure represented by general formula (1c) or (1d) is formed.

The weight average molecular weight of the modified diene-based polymer is not particularly limited, but is preferably 400,000 to 2,600,000, and more preferably 600,000 to 2,000,000.

In addition, according to this embodiment, the reaction of oxidative cleavage can be controlled by adjusting the kind or amount of the oxidizing agent, which is a chemical that dissociates double bonds, the reaction time, and the like. By such control, the molecular weight of the terminally modified diene-based polymer can be controlled.

The amount of the oxidizing agent incorporated is not particularly limited, but is, per 100 parts by mass of the diene-based polymer (solid content), preferably 0.1 to 2.0 parts by mass, and more preferably 0.2 to 0.6 parts by mass. The amount of the aminophosphonic acid compound incorporated is not particularly limited, but is, per kg of the diene-based polymer (solid content), preferably 0.05 to 1.0 mol, and more preferably 0.1 to 0.5 mol. When the amount incorporated is within the above range, excellent mechanical properties can be easily obtained.

As in this embodiment, when the polymer main chain is decomposed and allowed to react with an aminophosphonic acid compound to introduce phosphonic acids at the termini, pseudo crosslinks are formed. That is, as a result of physical linking caused by the interaction between the phosphonic acids introduced at the termini or between each phosphonic acid and a carbonyl group or formyl group generated from the oxidative cleavage of the polymer (van der Waals binding, hydrogen binding, etc.), the terminal phosphonic acids act as pseudo crosslinking points. As a result of the formation of pseudo crosslinks, strain-induced crystallization is promoted, whereby an improving effect on mechanical properties can be obtained. In addition, in the case where fracture energy is applied to a rubber composition containing the terminally modified diene-based polymer, these pseudo crosslinks are preferentially fractured while dispersing the fracture energy. Thus, the material as a whole has increased strength.

The rubber composition according to this embodiment may also contain, as a rubber component, other diene-based rubbers in addition to the terminally modified diene-based polymer described above. The kinds thereof are not particularly limited, and, for example, natural rubber (NR), isoprene rubber (IR), butadiene rubber (BR), styrene butadiene rubber (SBR), styrene-isoprene copolymer rubbers, butadiene-isoprene copolymer rubbers, styrene-isoprene-butadiene copolymer rubbers, and the like can be mentioned. These diene-based rubbers may be used alone, and it is also possible to use a blend of two or more kinds.

In the rubber composition according to this embodiment, the content of the terminally modified diene-based polymer in 100 parts by mass of the rubber component is not particularly limited, but is preferably 10 to 100 parts by mass, more preferably 30 to 100 parts by mass, and still more preferably 50 to 100 parts by mass.

In the rubber composition according to this embodiment, a reinforcing filler such as carbon black or silica can be used as an inorganic filler. That is, the inorganic filler may be carbon black alone, silica alone, or a combination of carbon black and silica. A combination of carbon black and silica is preferable. The content of the inorganic filler is not particularly limited, and is, for example, per 100 parts by mass of the rubber component, preferably 1 to 150 parts by mass, more preferably 1 to 100 parts by mass, and still more preferably 1 to 80 parts by mass.

Carbon black is not particularly limited, and various known species can be used. The content of carbon black is, per 100 parts by mass of the rubber component, preferably 1 to 70 parts by mass, and more preferably 1 to 30 parts by mass.

Silica is not particularly limited, but it is preferable to use wet silica, such as wet-precipitated silica or wet-gelled silica. The content of silica is, in view of the tan δ balance of the rubber, reinforcing properties, and the like, per 100 parts by mass of the rubber component, preferably 1 to 150 parts by mass, more preferably 1 to 100 parts by mass, and still more preferably 1 to 80 parts by mass.

In the case where silica is contained, a silane coupling agent, such as sulfide silane or mercapto silane, may further be contained. In the case where a silane coupling agent is contained, the content thereof is preferably 2 to 20 parts by mass per 100 parts by mass of silica.

In the rubber composition according to this embodiment, in addition to the components described above, additives, such as process oils, zinc oxide, stearic acid, softeners, plasticizers, waxes, and antioxidants, and vulcanizing formulation agents, such as vulcanizing agents and vulcanization accelerators, which are used in the usual rubber industry, can be suitably incorporated within the usual ranges.

As vulcanizing agents, sulfur components such as powder sulfur, precipitated sulfur, colloidal sulfur, insoluble sulfur, and highly dispersed sulfur can be mentioned. In addition, the content of the vulcanizing agent is, per 100 parts by mass of the rubber component, preferably 0.1 to 10 parts by mass, and more preferably 0.5 to 5 parts by mass. In addition, the content of the vulcanization accelerator is, per 100 parts by mass of the rubber component, preferably 0.1 to 7 parts by mass, and more preferably 0.5 to 5 parts by mass.

The rubber composition according to this embodiment can be made using a commonly used mixing machine, such as a Banbury mixer, a kneader, or a roll.

The obtained rubber composition can be used for tires, and is applicable to various areas of a tire, such as the treads and sidewalls of pneumatic tires of various sizes for various applications, including tires for passenger cars, large-size tires for trucks and buses, and the like. The rubber composition is formed into a predetermined shape in the usual manner, for example by extrusion, then combined with other parts, and vulcanization-molded at 140 to 180° C., for example, whereby a pneumatic tire can be produced.

The kind of pneumatic tire according to this embodiment is not particularly limited, and, as described above, various tires including tires for passenger cars, heavy-load tires used for trucks, buses, and the like, and the like can be mentioned.

EXAMPLES

Hereinafter, examples of the invention will be shown, but the invention is not limited to these examples.

Comparative Synthesis Example

Water was added to IR latex to prepare 200 g of a 30% DRC solution. Sodium dodecyl sulfate (2.0 g) was added and stirred in a nitrogen atmosphere for 1 hour, and then tert-butyl hydroperoxide (0.47 mL) and tetraethylenepentamine (0.65 mL) were added and stirred at 60° C. for 3 hours. The obtained reaction solution was added dropwise to acetone to aggregate the rubber content. The obtained rubber content was washed with water and dried at 50° C. under reduced pressure to give an oxidatively decomposed diene-based polymer.

Synthesis Example 1

Water was added to IR latex to prepare 200 g of a 30% DRC solution. Sodium dodecyl sulfate (2.0 g) was added and stirred in a nitrogen atmosphere for 1 hour, and then tert-butyl hydroperoxide (0.47 mL) and tetraethylenepentamine (0.65 mL) were added and stirred at 60° C. for 3 hours. Subsequently, ethanolamine phosphate (0.24 g) and 1,8-diazabicyclo[5,4,0]-7-undecene (0.28 ml) were added and stirred at 60° C. overnight. The obtained reaction solution was added dropwise to acetone to aggregate the rubber content. The obtained rubber content was washed with water and dried at 50° C. under reduced pressure to give a terminally modified diene-based polymer 1. The weight average molecular weight was $7.17 \times 10^5$.

Synthesis Example 2

Water was added to IR latex to prepare 200 g of a 30% DRC solution. Sodium dodecyl sulfate (2.0 g) was added and stirred in a nitrogen atmosphere for 1 hour, and then tert-butyl hydroperoxide (0.47 mL) and tetraethylenepentamine (0.65 mL) were added and stirred at 60° C. for 3 hours. Subsequently, ethanolamine phosphate (0.48 g) and 1,8-diazabicyclo[5,4,0]-7-undecene (0.56 ml) were added and stirred at 60° C. overnight. The obtained reaction solution was added dropwise to acetone to aggregate the rubber content. The obtained rubber content was washed with water and dried at 50° C. under reduced pressure to give a terminally modified diene-based polymer 2. The weight average molecular weight was $7.22 \times 10^5$.

Synthesis Example 3

Water was added to IR latex to prepare 200 g of a 30% DRC solution. Sodium dodecyl sulfate (2.0 g) was added and stirred in a nitrogen atmosphere for 1 hour, and then tert-butyl hydroperoxide (0.47 mL) and tetraethylenepentamine (0.65 mL) were added and stirred at 60° C. for 3 hours. Subsequently, ethanolamine phosphate (0.95 g) and 1,8-diazabicyclo[5,4,0]-7-undecane (1.1 ml) were added and stirred at 60° C. overnight. The obtained reaction solution was added dropwise to acetone to aggregate the rubber content. The obtained rubber content was washed with water and dried at 50° C. under reduced pressure to give a terminally modified diene-based polymer 3. The weight average molecular weight was $6.86 \times 10^5$.

Synthesis Example 4

Water was added to IR latex to prepare 200 g of a 30% DRC solution. Sodium dodecyl sulfate (2.0 g) was added and stirred in a nitrogen atmosphere for 1 hour, and then tert-butyl hydroperoxide (0.47 mL) and tetraethylenepentamine (0.65 mL) were added and stirred at 60° C. for 3 hours. Subsequently, alendronic acid (0.42 g) and 1,8-diazabicyclo[5,4,0]-7-undecene (0.28 ml) were added and stirred at 60° C. overnight. The obtained reaction solution was added dropwise to acetone to aggregate the rubber content. The obtained rubber content was washed with water and dried at 50° C. under reduced pressure to give a terminally modified diene-based polymer 4. The weight average molecular weight was $10.5 \times 10^5$.

Synthesis Example 5

Water was added to IR latex to prepare 200 g of a 30% DRC solution. Sodium dodecyl sulfate (2.0 g) was added and stirred in a nitrogen atmosphere for 1 hour, and then tert-butyl hydroperoxide (0.47 mL) and tetraethylenepentamine (0.65 mL) were added and stirred at 60° C. for 3 hours. Subsequently, alendronic acid (0.84 g) and 1,8-diazabicyclo[5,4,0]-7-undecene (0.56 ml) were added and stirred at 60° C. overnight. The obtained reaction solution was added dropwise to acetone to aggregate the rubber content. The obtained rubber content was washed with water and dried at 50° C. under reduced pressure to give a terminally modified diene-based polymer 5. The weight average molecular weight was $11.2 \times 10^5$.

Incidentally, the weight average molecular weights of the terminally modified diene-based polymers obtained above were measured by the following method.

[Weight Average Molecular Weight (Mw)]

Gel permeation chromatography (GPC) measurement was performed to determine the polystyrene-equivalent Mn, Mw, and Mw/Mn. Specifically, the measurement sample was dissolved in 1 mL of THE and used. Using "LC-20DA" manufactured by Shimadzu Corporation, the sample after passing through the filter was passed through the column (Shodex KL-807L) at a temperature of 40° C. and a flow rate of 1.0 mL/min and then subjected to detection using a differential index detector (RI).

Details of each component used in the synthesis examples are as follows.

IR latex: "IRL701" manufactured by BST Specialty Co., Ltd., weight average molecular weight=$16.0 \times 10^5$, cis content=98.99%

Sodium dodecyl sulfate: manufactured by FUJIFILM Wako Pure Chemical Corporation tert-Butyl hydroperoxide: manufactured by Tokyo Chemical Industry Co., Ltd.

Tetraethylenepentamine: manufactured by Tokyo Chemical Industry Co., Ltd.

Ethanolamine phosphate: manufactured by Tokyo Chemical Industry Co., Ltd.

Alendronic acid: manufactured by Tokyo Chemical Industry Co., Ltd.

1,8-Diazabicyclo[5,4,0]-7-undecene: manufactured by Nacalai Tesque, Inc.

Acetone: manufactured by Nacalai Tesque, Inc.

Using the obtained terminally modified diene-based polymers, rubber compositions were prepared following the formulation shown in Table 1, and vulcanized at 150° C. for 25 minutes. The mechanical strength of each obtained rubber composition after vulcanization was evaluated according to the following measurement method.

Details of each component used in the examples are as follows.

Oxidatively decomposed diene-based polymer: Oxidatively decomposed diene-based polymer obtained above in Comparative Synthesis Example.

Terminally modified diene-based polymers 1 to 5: Terminally modified diene-based polymers obtained above in Synthesis Examples 1 to 5

Carbon black: "N399 SEAST KH" manufactured by Tokai Carbon Co., Ltd.

Zinc oxide: "Type 1 Zinc Oxide" manufactured by Mitsui Mining & Smelting Co., Ltd.

Stearic acid: "LUNAC S-20" manufactured by Kao Corporation

Sulfur: "Powder Sulfur for Rubber, 150 mesh" manufactured by Hosoi Chemical Industry Co., Ltd.

Vulcanization accelerator: "NOCCELER CZ" manufactured by Ouchi Shinko Chemical Industrial Co., Ltd.

[Tensile Stress at 300% Elongation (MPa)]

Tensile stress at 3005 elongation (Mpa) at 25° C. was measured in a tensile test in accordance with JIS K6251 (Dumbbell No. 7) and expressed as an index taking the value in Comparative Example 1 as 100. A larger index indicates better failure properties (mechanical strength).

TABLE 1

|  | Functional Group | Amount of Aminophosphonic Acid Compound Added (mol/kg rubber) | Comparative Example 1 | Example 1 | Example 2 | Example 3 | Example 4 | Example 5 |
| --- | --- | --- | --- | --- | --- | --- | --- | --- |
| Oxidatively decomposed diene-based polymer | — | — | 100 | — | — | — | — | — |
| Terminally modified diene-based polymer 1 | PEA | 0.028 | — | 100 | — | — | — | — |
| Terminally modified diene-based polymer 2 | PEA | 0.056 | — | — | 100 | — | — | — |
| Terminally modified diene-based polymer 3 | PEA | 0.112 | — | — | — | 100 | — | — |
| Terminally modified diene-based polymer 4 | AA | 0.028 | — | — | — | — | 100 | — |

TABLE 1-continued

| | Functional Group | Amount of Aminophosphonic Acid Compound Added (mol/kg rubber) | Comparative Example 1 | Example 1 | Example 2 | Example 3 | Example 4 | Example 5 |
|---|---|---|---|---|---|---|---|---|
| Terminally modified diene-based polymer 5 | AA | 0.056 | — | — | — | — | — | 100 |
| | Carbon black | | 3 | 3 | 3 | 3 | 3 | 3 |
| | Zinc oxide | | 5 | 5 | 5 | 5 | 5 | 5 |
| | Stearic acid | | 2 | 2 | 2 | 2 | 2 | 2 |
| | Sulfur | | 2.25 | 2.25 | 2.25 | 2.25 | 2.25 | 2.25 |
| | Vulcanization accelerator | | 1.1 | 1.1 | 1.1 | 1.1 | 1.1 | 1.1 |
| | Stress at 300% elongation | | 100 | 128 | 139 | 141 | 115 | 125 |

* PEA = Ethanolamine phosphate
* AA = Alendronic acid

The results are as shown in Table 1. In Examples 1 to 5, better failure properties (mechanical strength) than in Comparative Example 1 were obtained. Also from these results, it is suggested that as a result of the introduction of phosphonic acids, an interaction occurred between the phosphonic acids introduced at the termini or between each phosphonic acid and a carbonyl group or formyl group generated from the oxidative cleavage of the polymer (van der Waals binding or hydrogen binding).

A rubber composition using the terminally modified diene-based polymer of the invention can be used for various tires for passenger cars, light trucks, buses, and the like.

What is claimed is:

1. A terminally modified diene-based polymer obtained by allowing a diene-based polymer terminated with ketone or aldehyde groups to react with an aminophosphonic acid compound represented by general formula (1) or (2):

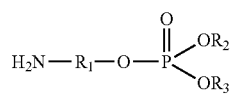
(1)

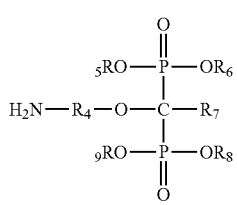
(2)

wherein in formulas (1) and (2), $R_1$ and $R_4$ each represent a alkanediyl group, $R_2$ and $R_3$ may be the same or different and each represent hydrogen, a $C_{1-3}$ alkyl group, or a phenyl group, $R_5$, $R_6$, $R_8$, and $R_9$ may be the same or different and each represent hydrogen, a $C_{1-3}$ alkyl group, or a phenyl group, and $R_7$ represents hydrogen or a hydroxyl group.

2. The terminally modified diene-based polymer according to claim 1, wherein the amount of the aminophosphonic acid compound added is 0.01 to 0.5 mol per kg of the diene-based polymer.

3. The terminally modified diene-based polymer according to claim 1, having a weight average molecular weight of 400,000 and 2,600,000.

4. The terminally modified diene-based polymer according to claim 2, having a weight average molecular weight of 400,000 and 2,600,000.

5. A method for producing a terminally modified diene-based polymer, comprising:
   an oxidative decomposition step of adding an oxidizing agent to a diene-based polymer to oxidatively cleave a carbon-carbon double bond, thereby giving an oxidatively decomposed diene-based polymer; and
   a terminal modification step of allowing the obtained oxidatively decomposed diene-based polymer to react with an aminophosphonic acid compound represented by general formula (1) or (2):

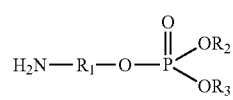
(1)

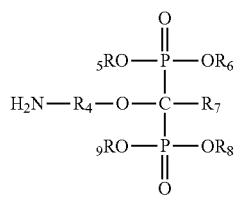
(2)

wherein in formulas (1) and (2), $R_1$ and $R_4$ each represent a $C_{1-10}$ alkanediyl group, $R_2$ and $R_3$ may be the same or different and each represent hydrogen, a $C_{1-3}$ alkyl group, or a phenyl group, $R_5$, $R_6$, $R_8$, and $R_9$ may be the same or different and each represent hydrogen, a $C_{1-3}$ alkyl group, or a phenyl group, and $R_7$ represents hydrogen or a hydroxyl group.

6. The method for producing a terminally modified diene-based polymer according to claim 5, wherein the amount of the aminophosphonic acid compound added is 0.01 to 0.5 mol per kg of the diene-based polymer.

7. The method for producing a terminally modified diene-based polymer according to claim 5, wherein rubber latex is used as the diene-based polymer.

8. The method for producing a terminally modified diene-based polymer according to claim 6, wherein rubber latex is used as the diene-based polymer.

* * * * *